United States Patent [19]

Rothwell

[11] 4,373,930
[45] Feb. 15, 1983

[54] AQUEOUS DISPERSIONS OF COLORING MATERIALS: POLY-ALKYLENEOXY NAPHTHALENE DISPERSING AGENTS

[75] Inventor: Geoffrey R. Rothwell, Chadderton, England

[73] Assignee: Imperial Chemical Industries Limited, London, England

[21] Appl. No.: 302,397

[22] Filed: Sep. 15, 1981

Related U.S. Application Data

[63] Continuation of Ser. No. 184,974, Sep. 8, 1980, abandoned.

[30] Foreign Application Priority Data

Oct. 3, 1979 [GB] United Kingdom ................. 7934326

[51] Int. Cl.$^3$ ............................................. D06P 67/00
[52] U.S. Cl. .......................................... 8/527; 8/528; 8/583; 8/589; 8/604; 8/610; 8/613; 8/648; 8/637; 106/308 Q; 252/182; 252/301.21
[58] Field of Search ................... 8/527, 528, 583, 587, 8/604, 610, 613, 589; 106/308 Q; 252/182, 301.21

[56] References Cited

U.S. PATENT DOCUMENTS

4,225,311  9/1980  Niimi et al. ............................. 8/524
4,233,026  11/1980  Hitschfel et al. ....................... 8/524

FOREIGN PATENT DOCUMENTS

53-06689  1/1978  Japan.
54-30220  3/1979  Japan.
1537374  12/1978  United Kingdom.
1559955  1/1980  United Kingdom.

Primary Examiner—A. Lionel Clingman
Attorney, Agent, or Firm—Cushman, Darby & Cushman

[57] ABSTRACT

An aqueous dispersion of a solid, especially a disperse dyestuff or a pigment, containing, as dispersing agent, a water-soluble, non-ionic polycyclic aromatic compound having a poly(lower alkylene-oxy)chain containing from 5 to 30 lower alkylene-oxy groups. Preferred dispersing agents contain about 10 ethylene-oxy groups in the chain. The dispersions of disperse dyestuffs are especially suitable for use in aqueous print pastes based on synthetic thickening agents and the pigment dispersions are suitable for use in emulsion paints.

7 Claims, No Drawings

AQUEOUS DISPERSIONS OF COLORING MATERIALS: POLY-ALKYLENEOXY NAPHTHALENE DISPERSING AGENTS

This is a continuation, of application Ser. No. 184,974 filed Sept. 8, 1980 now abandoned.

This invention relates to aqueous dispersions of water-insoluble materials, especially pigments and dyestuffs, and to aqueous print pastes derived from the dispersions containing pigments and dyestuffs and especially to print pastes containing "synthetic" thickening agents.

It has been normal practice in the printing of polyester textile materials with disperse dyestuffs to thicken the print pastes with materials of natural origin, such as alginates, but dissatisfaction with their technical performance coupled with a general world shortage of these "natural" thickeners has led to an increase in the use of certain "synthetic" thickening agents, such as polyacrylic acid and its derivatives and homologues, which have recently become available. Although these synthetic thickeners are generally superior to the established natural thickeners in many respects, they have one serious defect in that the viscosity of print pastes made with these thickeners is very sensitive to the presence of ionic species which generally cause a severe depression of viscosity. This defect has caused problems in the use of synthetic thickeners with print pastes containing disperse dyestuffs. These latter are usually dispersed with anionic dispersing agents and the dispersions therefore contain large quantities of ionic species.

The depression of viscosity of print pastes based on synthetic thickeners when ionic species are added can be overcome to some extent by increasing the quantity of the synthetic thickener but this reduces the commercial acceptability of these thickeners because an important advantage of synthetic thickeners over the natural thickeners is the smaller concentration required, hence the lower cost, to achieve a given viscosity, in the absence of ionic species. A lower level of thickener concentration is also technically desirable because this reduces the amount of washing off required and also reduces interference in the absorption of dyestuff by the substrate.

In order to accommodate disperse dyestuff dispersions in print pastes containing synthetic thickeners it has been proposed to replace the anionic dispersing agents with non-ionic dispersing agents, see for example UK No. 1537374. Non-ionic agents have, of course, been used for many years in the stabilisation of pigment dispersions but few of the established non-ionic agents have proved to be satisfactory for the preparation of dispersions of disperse dyestuffs and particularly such dispersions which are designed for incorporation in print pastes based on synthetic thickeners.

It has been proposed, in Japanese Patent Specification No. 54-30220 (Kokai) to prepare aqueous dispersions of perchlorate salts of basic dyestuffs using poly-(ethylene-oxy) derivatives of phenols and naphthols and to use such dispersions in aqueous print pastes containing natural or synthetic thickeners. The print pastes based on synthetic thickeners however contained sufficient thickener (15 to 20%) to have thickened a conventional dispersion of a disperse dyestuff containing an anionic dispersing agent. Furthermore the present applicants have found that the dispersions disclosed in the Japanese specification cannot be used to prepare print pastes of acceptable viscosity unless excessive quantities of thickener are used i.e. from about 5 to 10 times the normal usage.

It has now been found that certain polycyclic aromatic compounds carrying water-solubilising, poly(-lower alkylene-oxy) chains are particularly suitable as aids for dispersing water-insoluble inorganic and non-ionic organic solids, particularly pigments and dyestuffs, in aqueous media and that these compounds are especially suitable for preparing dispersions of disperse dyestuffs which will be incorporated into print pastes containing synthetic thickeners. These dispersions are also generally more compatible with natural thickeners than dispersions based on conventional non-ionic dispersing agents. This is an important advantage because printers may use natural and synthetic thickeners for different applications and it is commercially advantageous to be able to use a single colour dispersion in the different applications.

According to the present invention there is provided an aqueous dispersion of a finely-divided, water-insoluble, inorganic or non-ionic organic, solid containing a water-soluble, non-ionic, dispersing agent which comprises a polycyclic aromatic compound having a water-solubilising poly(lower alkylene-oxy) chain containing from 5 to 30 lower alkylene-oxy groups.

It is preferred that at least 50% and more preferably all, of the units in the poly(lower alkylene-oxy) chain are ethylene-oxy groups and, where other lower alkylene-oxy groups are present, that the ethylene-oxy groups form the part of the chain remote from the aromatic poly-cycle, in order to confer maximum water solubility on the dispersing agent. The term lower alkylene means an alkylene group containing from 2 to 4 carbon atoms although it is preferred that the chain comprises ethylene-oxy groups alone or a mixture of ethylene-oxy and propylene-oxy groups in separate blocks.

A preferred class of dispersing agent has the general formula:

wherein A represents a polycyclic aromatic radical; X represents a bridging group selected from —O—, —CO.O—, —S—, —NH—, and —NY—; and Y represents —(C$_3$H$_6$O)$_m$—(C$_2$H$_4$O)$_n$H wherein m is from 0 to n and m+n is from 5 to 30.

The polycyclic aromatic radical, A, desirably contains 2 or 3 fused rings and is preferably naphthyl which may carry other substituents, provided that these are not hydrophilic, although it is preferred that the radical, A, is free from substituents. As examples of suitable other substituents there may be mentioned halogen, particularly chlorine, and lower alkyl. It is further preferred that the naphthyl radical carries a single poly-(alkylene-oxy) chain in the β- or 2-position. It is also preferred that the bridging group is —O—.

It is preferred that m+n is from 5 to 15 and more preferably m is zero. Particularly good results have been obtained with poly(ethylene-oxy) chains containing from 8 to 12 ethylene-oxy groups.

Although the dispersions are particularly suitable for use with synthetic thickeners in the preparation of print pastes and so the preferred solids are disperse dyestuffs, the above defined dispersing agents are also suitable for use in the preparation of dispersions of other solids such as pigments, particularly organic pigments, optical brightening agents and anthraquinone, the dispersion of anthraquinone being suitable for use in wood pulping operations for promoting delignification.

As examples of the water-insoluble dyestuffs and pigments which may be incorporated in the present dispersion there are mentioned non-ionic, organic pigments and disperse dyestuffs of the azo, anthraquinone and phthalocyanine series and inorganic pigments such as metal oxides, iron blues and cadmium yellows.

In addition to the defined non-ionic dispersing agent and water-insoluble solid the dispersion may contain other additives such as anti-microbials, humectants and other surfactants. If the dispersion is to be used in the preparation of a print paste containing a synthetic thickener it is preferred that such additives are non-ionic in order to avoid depression of the viscosity of the print paste.

The dispersion preferably contains from 5% to 70%, by weight of the solid, based on the total weight and from 5% to 150%, by weight of the dispersing agent, based on the weight of the solid, especially preferred ranges being from 10% to 60% and from 20% to 100% respectively.

The mean diameter of the particles of the solid is preferably below 10 microns and more preferably below 5 microns.

The present dispersion may be prepared by any method for the preparation of finely divided dispersions of solids in aqueous media, for example, by grinding the solid together with the dispersing agent in water in a bead or a ball mill until the mean particle diameter of the solid is below 10 microns and more preferably below 5 microns.

Advantages of the present dispersion over other non-ionic dispersions, including those based on closely related dispersing agents, such as the poly(ethylene-oxy) derivatives of alkyl phenols, are greatly reduced foaming during milling, lower viscosity and therefore better handling properties, improved redispersion properties after drying out, improved stability over a range of temperatures and storage periods and greater resistance to "osmotic shock", the disturbance experienced when certain natural thickeners, which are ionic in character, are added to the dispersion during the preparation of a print paste.

Aqueous dispersions of colourants, particularly of disperse dyestuffs, for use in print pastes are generally prepared by the dyestuff manufacturer and may be distributed throughout the world for use by printers in the preparation of print pastes. They are thus frequently stored for long periods under a wide range of climatic conditions in unsealed containers. It is therefore important that the colourant is well protected against flocculation, aggregation and crystal growth so that it remains in a finely divided state until it is applied to a substrate in a print paste. Although precautions are taken to inhibit drying out, by the use of humectants, this cannot be completely avoided and it is therefore important that the dried dispersion should be readily redispersible by a simple mixing procedure without the formation of lumps and specks which can spoil print quality. Finally it is important that the dispersion should not be sensitive to dilution and the addition of the ingredients which are conventionally used in the preparation of aqueous print pastes.

As indicated hereinbefore the dispersions of the present invention, wherein the solid is a colourant, i.e. a pigment or a dyestuff, are particularly suitable for the preparation of print pastes and according to a further feature of the present invention there is provided an aqueous print paste comprising a finely-divided water-insoluble inorganic or non-ionic organic colourant, a dispersing agent which comprises a polycyclic aromatic compound having a water-solubilising poly(lower alkylene-oxy) chain containing from 5 to 30 lower alkylene-oxy groups and a thickening agent.

The term thickening agent includes both natural and synthetic thickening agents although preferred print pastes are those containing a disperse dyestuff and a synthetic thickening agent. The term "synthetic" thickening agent includes all those agents, suitable for the thickening of print pastes, which are not derived from natural products and, as examples there may be mentioned polyacrylates, such as polyacrylic acid and its derivatives and homologues, polyvinyl alcohol and ethylene/maleic anhydride co-polymers. As examples of natural thickening agents there may be mentioned locust bean/mannogalactan gum, guar gum (mannogalactan), sodium alginates, polysaccharides, starch ethers, hydroxylated and carboxylated starch ethers and oil-in-water emulsions.

A print paste based on a natural thickening agent preferably contains from 4% to 5% of the thickening agent whereas one based on a synthetic thickening agent preferably contains from 0.5% to 1.5% of the thickening agent. The weight of colourant may vary within wide limits depending on the depth of shade of print required and preferred proportions of the dispersing agent, in relation to the colourant, are those indicated hereinbefore in respect of the dispersions.

The print paste may be prepared in any convenient manner, a preferred method in the case of a disperse dyestuff dispersion being to dilute the dispersion with water and to add a concentrated solution of the thickening agent with vigorous agitation. Any other ingredients, such as wetting agents, fixation promoters and preservatives, may then be added to the paste.

The invention is further illustrated by the following Examples and assessments of these against dispersions containing conventional and other non-ionic dispersing agents. Unless otherwise stated, all parts and percentages are by weight.

EXAMPLE 1

53.2 Parts of a disperse dye paste containing 24.0 parts of the dyestuff 2:4-dinitro-2'-acetylamino-4'-N:N-bis(2-methoxycarbonyl ethyl)aminoazobenzene and 29.2 parts water are mixed with 12.0 parts of the condensation product of $\beta$-naphthol with 5 molecular proportions of ethylene oxide and 0.3 parts sodium o-phenyl phenate in a stainless-steel water-cooled vessel with an additional 54.5 parts of water and 360 parts of glass beads having a diameter of 0.35–0.5 mm.

Agitation is effected by three axially aligned 60 mm diameter nylon discs mounted 25 mm apart on a common stainless-steel shaft rotated at 3000 revolutions per minute for 15 minutes.

The dispersion containing 20% dyestuff and 10% dispersing agent, is very fluid and deflocculated with the bulk of dyestuff particles less than 2 microns in diameter.

EXAMPLE 2

51.2 Parts of a disperse dye paste containing 24.0 parts of the dyestuff 2-chloro-4-nitro-2'-acetylamino 4'-N:N-bis(2-methoxycarbonylethyl)aminoazobenzene and 27.2 parts of water are mixed with 19.2 parts of the condensation product of β-naphthol with 30 molecular proportions of ethylene oxide and 0.3 parts sodium o-phenyl phenate in a stainless-steel, water-cooled vessel with an additional 49.3 parts of water and 360 parts of glass beads having a diameter of 0.35–0.5 mm.

Agitation is effected as described in Example 1. After 20 minutes stirring the dispersion containing 20% dyestuff and 16% dispersing agent is very fluid and deflocculated with the bulk of the dyestuffs particles less than 2 microns in diameter.

EXAMPLE 3

23.2 Parts of a disperse dye paste containing 100 parts of the dye 2-chloro-4-nitro-2'-acetylamino-4'-N:N-bis(2-methoxycarbonylethyl)aminoazobenzene and 113.2 parts water are mixed with 80 parts of a condensation product of β-naphthol with 10 molecular proportions of ethylene oxide and 1.0 part sodium o-phenyl phenate in a stainless-steel, water-cooled vessel with an additional 142 parts of water, 63.8 parts of dipropylene glycol and 1500 parts of glass beads having a diameter of 0.35–0.5 mm.

Agitation is effected by three axially aligned 1250 mm diameter nylon discs mounted 25 mm apart on a common stainless steel shaft rotated at 1880 revolutions per minute for 20 minutes.

The dispersion containing 20% dyestuff and 16% dispersing agent is very fluid, and deflocculated with the bulk of dyestuff particles less than 2 microns in diameter.

EXAMPLE 4

221.7 Parts of a disperse dye paste containing 100 parts of the dye 2:4-dinitro-2'-acetylamino-4-N:N-bis(2-methoxycarbonylethyl)aminobenzene and 121.7 parts water are mixed with 80 parts of a condensation product of β-naphthol with 10 molecular proportions of ethylene oxide and 1.0 part sodium o-phenyl phenate in a stainless-steel, water-cooled vessel with an additional 198.3 parts water and 1500 parts of glass beads having a diameter of 0.35–0.5 mm.

Agitation is effected as described in Example 3 to yield a very fluid and deflocculated dispersion, containing 20% dyestuff and 16% dispersing agent, in which the bulk of dyestuff particles is less than 2 microns after 10 minutes.

EXAMPLE 5

242.7 Parts of a dyestuff paste containing 100 parts of the dye 2-chloro-4-nitro-6-bromo-4-N:N-bis(2-methoxycarbonylethyl)aminoazobenzene and 142.7 parts water together with 80 parts of a condensation product of β-naphthol with 5 molecular proportions of ethylene oxide and 1.0 parts sodium o-phenyl phenate are stirred in a stainless-steel, water-cooled vessel with an additional 176.3 parts water and 1500 parts glass beads having a diameter 0.35–0.5 mm.

Agitation is effected as described in Example 3 to yield a very fluid and deflocculated dispersion, containing 20% dyestuff and 16% dispersing agent, in which the bulk of dyestuff particles are less than 2 microns after 25 minutes.

EXAMPLES 6 TO 9

Dispersions are prepared according to the procedure described in Example 5 except that in place of the 80 parts of the condensation product of β-naphthol with 5 molecular proportions of ethylene oxide there are used 80 parts of the following dispersing agents:

| Example No. | Dispersing agent |
|---|---|
| 6 | β-naphthol with 10 molecular proportions of ethylene oxide. |
| 7 | β-naphthol with 15 molecular proportions of ethylene oxide. |
| 8 | β-naphthol with 20 molecular proportions of ethylene oxide. |
| 9 | β-naphthol with 30 molecular proportions of ethylene oxide. |

These dispersions have the same characteristics as the dispersion of Example 5.

EXAMPLE 10

258.9 Parts of a dyestuff paste containing 137.5 parts of the dye 3[4-(2',2-methoxyethoxy)ethoxycarbonyl]-phenylazo-4-methyl-5-cyano-6-hydroxy-N-ethylpyrid-2-one and 121.4 parts water are mixed with 110 parts of a condensation product of β-naphthol with 10 molecular proportions of ethylene oxide and 1 part sodium o-phenyl phenate and stirred in a stainless-steel, water-cooled pot with an additional 130.1 parts water and 1500 parts glass beads having a diameter 0.35–0.5 mm.

Agitation is effected as described in Example 3 to yield a very fluid and deflocculated dispersion containing 20% dyestuff and 16% dispersing agent in which the bulk of dyestuff particles are less than 2 microns after 15 minutes.

EXAMPLE 11

A dispersion is prepared according to the procedure described in Example 10 except that in place of the 110 parts of the condensation product of β-naphthol with 10 molecular proportions of ethylene oxide there are used 110 parts of a the condensation product of β-naphthol with 20 molecular proportions of ethylene oxide. This dispersion has the same characteristics as the dispersion of Example 10.

EXAMPLE 12

49.9 Parts of a disperse dye paste, containing 20 parts of the dyestuff 2-bromo-4,6-dinitroaniline coupled with 5-acetylamino-2-methoxy-N-β-(β'-methoxyethoxycarbonyl)ethylaniline (C.I. Disperse Blue 122) and 29.9 parts water, are mixed with 10.0 parts of the condensation product of β-naphthol with 10 molecular proportions of ethylene oxide, 59.9 parts of water and 0.24 part sodium o-phenyl phenate using a high-shear laboratory mixer (Silverson-RTM) for 10 minutes. The pH of the slurry is adjusted to 7.0. The slurry is then stirred in a stainless-steel, water-cooled vessel using 360 parts of glass beads having a diameter of 0.35–0.5 mm.

Agitation is effected by three axially aligned 60 mm diameter nylon discs mounted 25 mm apart on a common stainless-steel shaft rotated at 3000 rpm for 10 minutes.

The dispersion containing 16.6% dyestuff and 8.3% dispersing agent is very fluid and deflocculated with the bulk of dyestuff particles less than 2 microns in diameter.

EXAMPLE 13

44.1 Parts of a paste containing 20 parts of the dyestuff used in Example 12 are mixed with 10 parts of the condensation product of β-naphthol with 5 molecular proportions of propylene oxide followed by 5 molecular proportions of ethylene oxide, i.e. having the formula:

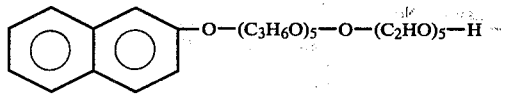

1.2 parts of a 20% solution of sodium o-phenyl phenate and 64.7 parts of water and milled for 10 minutes in a stainless-steel container with 360 parts of No. 8 Ballotini glass beads using a rotor fitted with three 2½″ perspex discs. At the end of the milling period the dispersion, containing 16.7% of dyestuff and 8.3% of dispersing agent, is deflocculated and very fluid with the average diameter of the dyestuff particles in the range 1 to 2 microns.

EXAMPLE 14

34.4 Parts of a paste containing 15 parts of the dyestuff 2-bromo-4,6-dinitro-2′-acetylamino-4′-N:N-bis(2-acetoxyethyl)amino-5′-methoxyazobenzene and 19.4 parts of water are stirred together with 12 parts of the dispersing agent used in Example 3, 0.25 parts of sodium orthophenyl phenate and 73.35 parts of water in a stainless-steel, water-cooled vessel and the pH is adjusted to 7.0±0.2 by addition of 0.5 parts of a 20% acetic acid solution. The stirrer consists of three parallel axially aligned discs mounted 25 mm apart on a common stainless steel shaft, each disc being 65 mm in diameter and 9 mm thick.

To the stirred mixture are added 350 parts of glass beads having a mean diameter of 0.35–0.5 mm and stirring is continued for 20 minutes at 3200 revs per minute, after which the dispersion is separated from the beads by screening.

The dispersion, containing 12.5% of dyestuff and 10% of dispersing agent is fluid and deflocculated with the mean diameter of the particles below 3 microns.

EXAMPLE 15

A dispersion is made by the procedure described in Example 14 except that in place of the 34.4 parts of the dyestuff paste identified therein there is used 81.4 parts of a dyestuff paste containing 24 parts of the dyestuff 2-cyano-4-nitro-2′-methyl-4′-N:N-bis(2-acetoxyethyl)azobenzene and 57.4 parts of water, in place of the 12 parts of dispersing agent there are used 19.2 parts of the same dispersing agent, in place of the 73.35 parts of water there are used 15.4 parts of dipropylene glycol and 3.75 parts of water and the pH is adjusted to 7.0±0.2 with 2.0 parts of 20% acetic acid solution.

The dispersion containing 20% of dyestuff and 16% of dispersing agent is very fluid and deflocculated with the mean diameter of the dyestuff particles below 3 microns.

EXAMPLE 16

29.3 Parts of a paste containing 24 parts of the dyestuff 2-bromo-4-nitro-6-chloro-2′-chloro-4′-N:N-bis(2-hydroxyethyl)aminoazobenzene and 5.3 parts of water are stirred together with 12.0 parts of the dispersing agent described in Example 3, 0.25 parts of sodium orthophenyl phenate, 15.4 parts of dipropylene glycol and 63.05 parts of water in a stainless-steel, water-cooled vessel and the pH is adjusted to 7.0±0.2 by the addition of 1 part of a 20% solution of acetic acid. The mixture is processed according to the procedure described in Example 14 except that stirring is continued for 45 minutes.

The dispersion, containing 20% of dyestuff and 10% of dispersing agent is very fluid and deflocculated with the mean diameter of the dyestuff particles below 3 microns.

EXAMPLE 17

A dispersion is prepared according to the method described in Example 16 except that the proportion of the dispersing agent is raised from 12.0 parts to 19.2 parts and the water is reduced from 63.05 parts to 55.85 parts.

The dispersion has the same characteristics as the dispersion described in Example 16.

EXAMPLE 18

A dispersion is prepared according to the method described in Example 10 except that in place of the 110 parts of the condensation product of β-naphthol with 10 molecular proportions of ethylene oxide and the 130.1 parts of water there are used 68.75 parts of the condensation product of β-naphthol with 5 molecular proportions of ethylene oxide and 171.35 parts of water. The dispersion has the same characteristics as the dispersion described in Example 10.

EXAMPLE 19

240 Parts of C.I. Pigment Yellow 3 (C.I. 11710), 21.6 parts of the β-naphthol/ethylene oxide condensate described in Example 3, 60 parts of ethylene glycol and 78.4 parts of water are mixed together in a stainless-steel vessel and stirred together with 1000 parts of No. 3 Ballotini glass beads using a rotor carrying three 4″ perspex discs rotating at 1880 rpm for 30 minutes. The vessel is cooled externally with water during the milling operation. The milled paste, containing 60% by weight of pigment and 9% by weight of dispersing agent, is separated from the beads and found to be fluid and deflocculated with the average particle diameters in the range 1 to 2 microns.

EXAMPLE 20

This dispersion is prepared according to the procedure described in Example 19 except that the β-naphthol/ethylene oxide condensate is replaced by the same quantity of β-naphthol/ethylene oxide condensate described in Example 13. The dispersion is fluid and deflocculated with average particle diameters in the range 1 to 2 microns.

EXAMPLE 21

This dispersion is prepared according to the procedure described in Example 19 except that the β-naphthol/ethylene oxide condensate is replaced by the condensate of β-naphthol with 5 molecular proportions of propylene oxide followed by 10 molecular proportions of ethylene oxide, i.e. having the formula:

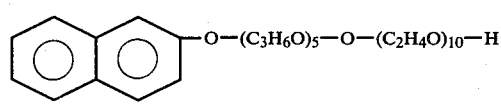

The dispersion is fluid and deflocculated with average particle diameters in the range 1 to 2 microns.

Test 1—Dispersibility Test

The quantity of a dispersion which contains 20 g of single strength colour is added to 400 g water in a beaker and this is stirred for a fixed period with a standardised stirrer (this same fixed period and stirrer is used for each assessment). At the end of the fixed period stirring is stopped and the dispersion is allowed to rest for 30 seconds. The top 300 ml of the dispersion is then decanted and the remaining portion filtered through a filter cloth with a pore size of 25 microns under a slight vacuum. The cloth is then air dried and the deposition assessed on a 1 to 5 scale analogous to the Standard Grey Scale, in which the rating 1 indicates complete absence of deposit and the rating 5 a thick deposit over the cloth. For commercial acceptability, i.e. to pass this test, a dispersion must achieve a rating of 2–3 or better. Ratings of 3 or above are recorded as failures.

Test 2—Redispersibility Test

A standard quantity (2 g) of the dispersion is placed in a 250 ml beaker and swirled around until the side of the beaker is evenly wetted by the dispersion to a height of 1". The beaker is then stored at room temperature until dry to a constant weight. The dry product is then redispersed in 100 ml at 55° C. by repeated transfer of the liquor between two beakers until no further deposited material is removed from the side and base of the beaker. The redispersed material is then filtered under vacuum, through two 7 cm. Whatman No. 4 filter papers dressed over a 6 cm diameter 100 mesh gauze and the papers are air dried. The deposition is assessed on a 1 to 5 scale as in Test 1 above with Rating 1 indicating complete redispersion and absence of any coarse particles and Rating 5 indicating incomplete redispersion, i.e. material remaining on side and base of beaker, and a heavy deposit of coarse particles on the filter paper. To pass this test a dispersion must achieve a rating of 2–3 or better. Ratings of 3 or above are recorded as failures. Although this test is a measure of quality of dispersion success is not essential for commercial acceptability.

Test 3—Accelerated Storage and Temperature Variation Procedure

A 50 g sample of a dispersion is placed in a programmable oven which over a 24 hour period covers the following temperature cycle:

Temperature Cycle

1. Hold at $-15°$ C. for 6 hours.
2. Raise temperature to 35° C. over 4 hours.
3. Hold at 35° C. for 8 hours.
4. Reduce temperature to $-15°$ C. over 6 hours.

The dispersion is examined for quality before and after one or more cycles.

Print Pastes

Recipe 1—Print Paste with Natural Thickener

| Dispersion | X parts | |
|---|---|---|
| Thickener | 500 parts | (10% solution of Sodium Alginate) |
| Fixation Assistant | 20 parts | (butyl ricinoleate) |
| Wetting Agent | 20 parts | (aqueous emulsion of sulphonated sperm and pine oils) |
| Water | (460-X) parts | |
| | 1000 parts | |

The dispersion is diluted with the water and the thickener stirred into this mixture. Finally the other ingredients are mixed into the paste.

Recipe 2—Print Paste with Synthetic Thickener

| Dispersion | X parts | |
|---|---|---|
| Thickener | 650 parts | (4.6% solution of a clear concentrate of polyacrylic acids containing from 15 to 30% actual thickener - Acraconc 276) |
| Water | (350-X) parts | |
| | 1000 parts | |

The dispersion is diluted with the water and the thickener is stirred into the mixture.

Before printing pale shades, for the assessment of printing quality, these print pastes are reduced in strength with the following reduction pastes

| Natural | | Synthetic | |
|---|---|---|---|
| Fixation Assistant | 20 parts | Thickener | 650 parts |
| Wetting Agent | 20 parts | Water | 350 parts |
| Thickener | 500 parts | | 1000 parts |
| Water | 460 parts | | |
| | 1000 parts | | |

In preparing print pastes with Examples 1 to 9 and 15 to 17 and with Comparative Dispersions 1, 2 and 14 to 22, X=5 for both types of print paste and each is diluted in the ratio 1:6 with the appropriate reduction paste.

In preparing print pastes with Examples 12 to 14 and with Comparative Dispersions 3 to 13, X=10 for both types of print paste and each is diluted in the ratio 1:9 with the appropriate reduction paste.

In preparing print pastes with Examples 10, 11 and 18, X=3 for both types of print paste and each is diluted in the ratio 1:6 with the appropriate reduction paste.

The pastes are applied to polyester crepe material by roller printing.

The pale shade prints on the polyester material are assessed for the presence or absence of specks of undispersed colour on a 1 to 5 scale as follows: 1: speck *free;* 2: *trace* specky; 3: *little* specky; 4: *specky;* 5: *very* specky.

Prints having a rating of 2 or better are generally commercially acceptable although slightly worse ratings may be acceptable with some deep shades such as navies and blacks. In the following Assessments only the underlined portions of the above ratings are used in the Tables.

Assessment of Dispersions and of Print Pastes and Paints Containing the Dispersions

1. Assessment of Examples 5 to 9

Five print pastes each containing one of these dispersions are prepared according to Recipe 1 and five print pastes are prepared according to Recipe 2. These 10 print pastes are assessed for speckiness of print on a polyester crepe fabric.

The five dispersions are also assessed for the extent of dispersion according to Test 1 and for redispersibility after drying out according to Test 2.

EXAMPLES 22 TO 31

Aqueous dispersions of each of the solids set out in Table 1, containing 20% by weight, of solid and 10%, by weight, of the β-naphthol/ethylene oxide condensate described in Example 3, are prepared by grinding mixtures of water, the solid and the condensate in a shaken bead mill. The milled dispersions are fluid, deflocculated and non-frothy. The mean particle diameters of the solids are in the range 1 to 2 microns.

TABLE 1

| Example No. | Pigment | Commercial Name |
|---|---|---|
| 22 | $TiO_2$ (C.I. No. 77891) | Tioxide RCR2 (Tioxide Group Ltd.) |
| 23 | Yellow Iron Oxide (C.I. No. 77492) | Grade 920 (Bayer) |
| 24 | Cadmium Yellow (C.I. No. 77199) | Grade N:12 (Reckitts) |
| 25 | β-form Copper Phthalocyanine crude (C.I. Pigment Blue 15:3) | — |
| 26 | α-form Copper Phthalocyanine crude (C.I. Pigment Blue 15) | Monastral Blue BX (ICI) |
| 27 | β-form Copper Phthalocyanine crude (C.I. Pigment Blue 15:3) | Monastral Blue BG (ICI) |
| 28 | β-form Copper Phthalocyanine crude (C.I. Pigment Blue 15:3) | Monastral Blue LBX (ICI) |
| 29 | Iron Blue (C.I. Pigment Blue 27) | Manox |
| 30 | Ultramarine (C.I. Pigment Blue 29) | A 120 |
| 31 | Anthraquinone | — |

EXAMPLE 32

A dispersion is prepared according to the method of Example 3 except that the 63.8 parts of dipropylene glycol are replaced with 63.8 parts of water and in place of the 80 parts of the condensation product of β-naphthol with 10 molecular proportions of ethylene oxide there are used 80 parts of the condensation product of α-naphthol with 10 molecular proportions of ethylene oxide. The dispersion has the same characteristics as the dispersion of Example 3.

EXAMPLE 33

A dispersion is prepared according to the method of Example 2 except that in place of the 19.2 parts of the condensation product of β-naphthol with 30 molecular proportions of ethylene oxide there are used 19.2 parts of the condensation product of α-naphthol with 30 molecular proportions of ethylene oxide. The dispersion has the same characteristics as the dispersion of Example 2.

The following Comparative Dispersion (C.D. No. 1 to 23) are prepared using conventional and other non-ionic dispersing agents lying outside the definition of the agents used for the present dispersions, for the purposes of the ensuing Assessments of the foregoing Examples.

COMPARATIVE DISPERSIONS 1 AND 2

These dispersions are prepared according to the method described in Example 2 except that in place of the 19.2 parts of the condensation product of β-naphthol with 30 molecular proportions of ethylene oxide there are used, for Comparative Dispersion 1, the condensation product of β-naphthol with 50 molecular proportions of ethylene oxide, and for Comparative Dispersion 2, the condensation product of β-naphthol with 100 molecular proportions of ethylene oxide.

COMPARATIVE DISPERSIONS 3 TO 13

These dispersions are made according to the method described in Example 12 except that in place of the 10 parts of the condensation product of β-naphthol with 10 molecular proportions of ethylene oxide there are used in each case 10 parts of the agent identified in Table 2.

TABLE 2

| Comparative Dispersion No. | Dispersing Agent | Trade Name |
|---|---|---|
| 3 | nonyl-phenol-(ethylene oxide)$_n$ n = 30 | Renex 650 |
| 4 | nonyl-phenol-(ethylene oxide)$_n$ n = 10 | Synperonic NP 10 |
| 5 | nonyl-phenol-(ethylene oxide)$_n$ n = 20 | Synperonic NP 20 |
| 6 | nonyl-phenol-(ethylene oxide)$_n$ n = 30 | Synperonic NP 30 |
| 7 | nonyl-phenol-(ethylene oxide)$_n$ n = 35 | Ethylan HA |
| 8 | nonyl-phenol-(ethylene oxide)$_n$ n = 50 | Ethylan N50 |
| 9 | nonyl-phenol-(ethylene oxide)$_n$ n = 92 | Ethylan 92 |
| 10 | $C_{16}/C_{18}$—alcohol-(ethylene oxide)$_n$ n = 30 | Berol 081 |
| 11 | $C_{13}/C_{15}$—alcohol (ethylene oxide)$_n$ n = 30 | Synperonic A 30 |
| 12 | $C_{13}/C_{15}$—alcohol-(ethylene oxide)$_n$ n = 20 | Synperonic A 20 |
| 13 | glycerol mono-oleate | — |

COMPARATIVE DISPERSIONS 14 TO 22

These dispersions are prepared according to the method of Example 32 except that in place of the 80 parts of the condensation product of α-naphthol with 10 molecular proportions of ethylene oxide there are used in each case 80 parts of the agent identified in Table 3.

TABLE 3

| Comparative Dispersion No. | | Trade Name |
|---|---|---|
| 14 | $H(OC_2H_4)_{60}(OC_3H_6)_{39}(OC_2H_4)_{60}OH$ | Synperonic PE 39/70 |
| 15 | octyl-phenol-$(C_2H_4O)_{70}H$ | Triton X-705 |
| 16 | $(HOC_2H_4)_2$—$NC_2H_4N$—$(C_2H_4OH)_2$ | — |
| 17 | R—COO—$(C_2H_4O)_{15}H$ (R = fatty acid or rosin acid) | Ethofat 242/25 |
| 18 | $C_6H_5O$—$(C_2H_4O)_nH$ n = 5 | — |
| 19 | $C_6H_5O$—$(C_2H_4O)_nH$ n = 10 | — |
| 20 | 4-$CH_3$—$C_6H_4O$—$(C_2H_4O)_nH$ n = 5 | — |
| 21 | 4-$CH_3$—$C_6H_4O$—$(C_2H_4O)_nH$ n = 10 | — |
| 22 | $[H(OC_2H_4)_{26}(OC_3H_6)_{29}]_2$—$NC_2H_4N$—$[(C_3H_6O)_{29}(C_2H_4O)_{26}H]_2$ | Tetronic 1504 |

COMPARATIVE DISPERSION 23

This is prepared by the method described in Example 18 except that in place of the β-naphthol/ethylene oxide condensate there is used the same quantity of a condensate of nonyl phenol with 13 molecular proportions of ethylene oxide (Lubrol N 13).

In the ensuing Assessments of Examples 1 to 21 and Comparative Dispersions 1 to 23 the following Tests, Recipes and Procedures are employed.

The results of these comparisons are set out in Table 4 below.

TABLE 4

| Example | Dispersibility (Test 1) | Redispersibility (Test 2) | Print Quality Recipe 1 | Print Quality Recipe 2 |
|---|---|---|---|---|
| 9 | Pass (1–2) | Fail (>5) | Trace | Free |
| 8 | Pass (1–2) | Fail (>5) | Free | Free |
| 7 | Pass (2–3) | Pass (2) | Free | Free |
| 6 | Pass (2) | Pass (1–2) | Free | Free |
| 5 | Pass (2–3) | Pass (2) | Trace | Free |

It can be seen from these results that these dispersions, all of which fall within the scope of the present invention, pass the dispersibility test and that they are all within commercial limits in terms of print quality with both natural and synthetic thickeners. Although the dispersions of Examples 8 and 9, which contain agents having chains containing 20 or more ethyleneoxy units do not pass the redispersibility test it will be seen from the comparisons reported below that few non-ionic dispersing agents are capable of stabilising dyestuffs to this stringent standard.

2. Assessment of Examples 2, 3, 32 and 33 and Comparative Dispersions (C.D.) 1 and 2

The four dispersions are compared for dispersibility according to Test 1 and are also incorporated into print pastes according to Recipe 1 and Recipe 2 which are assessed for print quality on polyester crepe fabric. The results are set out in Table 5 below.

TABLE 5

| Dispersion/Example No. | Dispersibility (Test 1) | Redispersibility (Test 2) | Print Quality Recipe 1 | Print Quality Recipe 2 |
|---|---|---|---|---|
| 3 | Pass (1) | Pass (1) | Trace | Free |
| 2 | Pass (2) | Fail (>5) | Specky | Free |
| 32 | Pass (1) | Pass (2–3) | Free | Free |
| 33 | Pass (2) | Fail (5) | Free | Free |
| C.D. 1 | Fail (4) | Fail (>5) | Very | Free |
| C.D. 2 | Pass (1–2) | Fail (>5) | Very | Free |

These results indicate that the four dispersions which fall within, and are spread across, the scope of the present invention have much superior properties to the two dispersions based on agents having longer ethylene-oxy chains which give completely unsatisfactory print pastes with natural thickeners and have generally unsatisfactory dispersion properties.

3. Assessment of Example 12 and Comparative Dispersions 3 to 13

The dispersion of Example 12 is compared with the other dispersions for condition, i.e. frothiness and fluidity, particle size of the dyestuff and redispersibility after drying out (Test 2). The results of the comparisons are set out in Table 6.

TABLE 6

| Example/C.D. No. | Condition | Particle Size Distribution ($\mu$ = micron) | Redispersibility (Test 2) |
|---|---|---|---|
| C.D. 3 | Fluid; frothy | 1–3$\mu$ | Fail (5) |
| C.D. 4 | Thick; frothy | 1–6$\mu$ | Fail (5) |
| C.D. 5 | Fluid; frothy | 1–2$\mu$ | Fail (5) |
| C.D. 6 | Fluid; frothy | 1–2$\mu$ | Fail (5) |
| C.D. 7 | Fluid; frothy | 1–3$\mu$ + aggretates | Fail (5) |
| C.D. 8 | Fluid; frothy | 1–3$\mu$ + aggregates | Fail (5) |
| C.D. 9 | Fluid; frothy | 1–3$\mu$ + aggregates | Fail (5) |
| C.D. 10 | Thick; frothy | 1–4$\mu$ + aggregates | Fail (5) |
| C.D. 11 | Fluid; frothy | 1–2$\mu$ + aggregates | Fail (5) |
| C.D. 12 | Fluid; frothy | 1–2$\mu$ + aggregates | Fail (5) |
| C.D. 13 | Gelled; frothy | 1–2$\mu$ | Pass (2–3) |
| Ex. 12 | Very fluid; froth free | 1–2$\mu$ | Pass (1–2) |

The dispersion of Example 12 when converted into a print paste according to Recipe 1 or 2 also produces speck-free prints on polyester fabric.

The results of Table 6 demonstrate that the dispersions based on ethoxylated nonyl phenols are inferior to a dispersion according to the present invention containing an ethoxylated naphthol. This is surprising in view of the teaching of Japanese Patent Specification No. 54-30220 that ethoxylated alkylphenols are equivalent to ethoxylated naphthols in their ability to disperse water-insoluble perchlorate salts of cationic dyestuffs. Table 6 also shows that a number of other conventional non-ionic dispersing agents comprising long carbon chains attached to poly(ethyleneoxy) chains fail to produce satisfactory dispersions of disperse dyestuffs.

4. Assessment of Example 32 and Comparative Dispersions (C.D.) 13 to 22

The dispersion of Example 32 is compared with the other comparative dispersions for dispersibility (Test 1), redispersibility after drying out (Test 2) and speckiness of print after incorporation into a print paste according to Recipe 1 and Recipe 2 and printing onto polyester fabric. The results are set out in Table 7.

TABLE 7

| Example/C.D. Number | Dispersibility Test 1 | Redispersibility Test 2 | Print Quality Recipe 1 | Print Quality Recipe 2 |
|---|---|---|---|---|
| C.D. 14 | Pass (1–2) | Fail (>5) | Free | Free |
| C.D. 15 | Pass (1–2) | Fail (5) | Little | Free |
| C.D. 16 | Pass (1–2) | Fail (>5) | Specky | Free |
| C.D. 17 | Pass (1) | Fail (>5) | Free | Free |
| C.D. 18 | Pass (1) | Fail (>5) | Little | Free |
| C.D. 19 | Fail (3) | Fail (>5) | Specky | Trace |
| C.D. 20 | Fail (3–4) | Fail (3) | Very | — |
| C.D. 21 | Fail (4) | Fail (>5) | Specky | Free |
| C.D. 22 | Pass (2) | Pass (1–2) | Free | Free |
| Ex. 32 | Pass (1) | Pass (2–3) | Free | Free |

These results demonstrate that a dispersing agent used to form the dispersions of the present invention is greatly superior to a wide variety of conventional non-ionic dispersing agents, the only agents performing in an equally satisfactory manner being essentially long chain block co-polymers of propylene and ethylene oxides and these are not closely related in structure to the present agents.

5. Assessment of Examples 19 to 21 and Dispersion 23

Each of the dispersions is incorporated into a white, pva-acrylic co-polymer emulsion paint. The emulsion paints are applied by K-bar to a substrate and assessed when dry. The strength of the paints is adjusted until all give the same visual effect and the relative strengths of the dispersions used to make the paints thereby determined. The results of the assessments are set out in Table 8.

TABLE 8

| Dispersion/Example No. | Strength | Condition of Dispersion |
|---|---|---|
| C.D. 23 | Control | just pourable - frothy |
| Ex. 19 | 10% stronger | very fluid - no froth |
| Ex. 20 | 10% stronger | very fluid - no froth |
| Ex. 21 | 10% stronger | very fluid - no froth |

The results in Table 8 demonstrate that not only can fluid dispersions containing 60% dispersed solid be prepared using the defined dispersing agents but also that the colour yield of such dispersions is superior to that obtained using a closely-related conventional non-ionic dispersing agent.

6. Assessment of Examples 1-4 and 10-18

The dispersions of these Examples are assessed for dispersibility (Test 1), redispersibility (Test 2) and speckiness of print after incorporation into print pastes according to Recipes 1 and 2 and printing onto polyester fabric. The results are set out in Table 9.

TABLE 9

| Example No. | Dispersibility Test 1 | Redispersibility Test 2 | Print Quality Recipe 1 | Print Quality Recipe 2 |
|---|---|---|---|---|
| 1 | Pass (1) | Pass (1) | Very | Free |
| 2 | Pass (1) | Fail (>5) | Specky | Free |
| 3 | Pass (1) | Pass (1) | Free | Free |
| 4 | Pass (1) | Pass (1) | Free | Free |
| 10 | Pass (1-2) | Pass (1) | Free | Free |
| 11 | Pass (1-2) | Fail (4) | Free | Free |
| 12 | Pass (1-2) | Pass (1) | Free | Free |
| 13 | Pass (2) | Pass (1) | Specky | Free |
| 14 | Pass (1) | Pass (1) | Free | Free |
| 15 | Pass (1) | Pass (1) | Free | Free |
| 16 | Pass (1) | Pass (1) | Free | Free |
| 17 | Pass (1) | Pass (1) | Free | Free |
| 18 | Pass (1-2) | Pass (1) | Free | Free |
| 32 | Pass (1) | Pass (2-3) | Free | Free |
| 33 | Pass (2) | Fail (5) | Trace | — |

The results in Table 9 demonstrate that a range of dispersions falling within the scope of the present invention containing many different dyestuffs and dispersing agents have generally acceptable dispersion properties and generally give acceptable quality prints on polyester fabric from print pastes containing natural or synthetic agents.

7. Assessment of Examples 3, 4, 15 and 16 in the Accelerated Storage and Temperature Variation Procedure.

Samples of the dispersions of Examples 3, 4, 15 and 16 are passed through 5 cycles of the Storage and Temperature Variation Procedure and resubmitted to Tests 1 and 2 and converted into print paste according to Recipes 1 and 2 for assessment of print quality in pale shades. In each case the results are the same as with dispersions which have not been submitted to this Procedure. These results indicate that the dispersion will be stable to long periods of storage under a wide range of climatic conditions.

I claim:

1. An aqueous dispersion of a finely-divided, inorganic or non-ionic, organic solid selected from the groups consisting of disperse dyestuffs, pigments, optical brightening agents and anthraquinone, containing a water-soluble, non-ionic dispersing agent which comprises naphthalene carrying, in the alpha or the beta position, a water-solubilising poly($C_2$ to $C_4$ alkyleneoxy) chain containing from 5 to 15 $C_2$ to $C_4$ alkyleneoxy groups and otherwise free from substituents.

2. An aqueous dispersion according to claim 1 wherein at least 50% of the $C_2$ to $C_4$ alkyleneoxy groups are ethyleneoxy groups.

3. An aqueous dispersion according to claim 1 wherein the dispersing agent has the formula:

$$A-X-Y$$

wherein
A represents unsubstituted naphthyl;
X represents a group selected from —O—, —Co.O— and —S—; and
Y represents —$(C_3H_6O)_m$—$(C_2H_4O)_n$ wherein m is from O to n and m+n is from 5 to 15.

4. An aqueous dispersion according to claim 3 wherein X is —O—.

5. An aqueous dispersion according to claim 1 containing from 5 to 70%, by weight, of the solid and from 5 to 150%, by weight, based on the weight of the solid, of the dispersing agent.

6. An aqueous print paste comprising a dispersion according to any one of claims 1 to 4 and 5 wherein the solid is a disperse dyestuff, and a thickening agent.

7. A print paste according to claim 6 wherein the thickening agent is a synthetic thickening agent.

* * * * *